United States Patent [19]

Hongo

[11] Patent Number: 4,556,985

[45] Date of Patent: Dec. 3, 1985

[54] PATTERN RECOGNITION APPARATUS

[75] Inventor: Yasuo Hongo, Hino, Japan

[73] Assignee: Fuji Electric Company, Inc., Japan

[21] Appl. No.: 504,263

[22] Filed: Jun. 14, 1983

[30] Foreign Application Priority Data

Jun. 28, 1982 [JP] Japan ................................ 57-109746

[51] Int. Cl.$^4$ ............................................... G06K 9/12
[52] U.S. Cl. ...................................... 382/30; 382/34; 382/36
[58] Field of Search ....................... 382/30, 33, 34, 41, 382/54, 55; 381/41-43

[56] References Cited

U.S. PATENT DOCUMENTS

| | | | |
|---|---|---|---|
| 3,178,688 | 4/1965 | Hill et al. | 382/26 |
| 3,576,534 | 4/1971 | Steinberger | 382/34 |
| 3,601,802 | 8/1971 | Nakagome et al. | 382/37 |
| 3,618,016 | 11/1971 | Van Steenis | 382/30 |
| 3,846,754 | 11/1974 | Oka et al. | 382/55 |
| 4,110,737 | 8/1978 | Fahey | 382/30 |
| 4,162,482 | 7/1979 | Su | 382/55 |
| 4,183,013 | 1/1980 | Agrawala et al. | 382/26 |
| 4,398,256 | 8/1983 | Nussmeier et al. | 382/54 |

OTHER PUBLICATIONS

"Stamped Character Inspection Apparatus Based on the Bit Matrix Method" Y. Hongo and A. Komuro, Proceedings of 6th Int. Conf. on Pattern Rec., Oct., 1982, pp. 448–450.

Primary Examiner—Leo H. Boudreau

Attorney, Agent, or Firm—Brumbaugh, Graves, Donohue & Raymond

[57] ABSTRACT

A pattern recognition apparatus for identifying characters for example comprises a scanner and data extraction circuit which obtains a rectangular sized M×N bit pattern matrix B(i,j) representing the presence and configuration of an unknown scanned pattern in subregions (i,j) of a frame which substantially encloses the scanned pattern, wherein each bit in the pattern has a pattern present value when the scanned pattern falls at least partially within its associated subregion and a pattern absent value when the scanned pattern does not fall within its associated subregion. A processor compares the bit pattern matrix with a plurality of previously obtained bit pattern matrices $B_S{}^K(i,j)$ for a respective plurality of known reference patterns K, and outputs for each reference pattern K a comparison quantity value $D^K$ whose amplitude represents the degree of correspondence between the bit pattern matrix B(i,j) from scanning the unknown pattern and the bit pattern matrices $B_S{}^K(i,j)$ for each reference pattern K. The processor then selects the lowest and next lowest comparison quantity values and outputs a pattern identification signal which identifies the unknown pattern as the reference pattern corresponding to the lowest quantity value if this value is less than a first preset value, and if the difference between the lowest and next lowest comparison quantity values is greater than a second preset value.

1 Claim, 16 Drawing Figures

| | | | | |
|---|---|---|---|---|
| 1 | 2 | 2 | 2 | |
| 1 | 2 | 2 | 2 | |
| 2 | | | | 2 |
| 2 | | -2 | | 2 |
| 2 | | -2 | | 2 |
| 2 | | -2 | | 2 |
| 2 | | -3 | | |
| 2 | | | | |
| 1 | 4 | 4 | 4 | |
| 1 | 4 | 4 | 4 | |
| 2 | | | | |
| 2 | | -3 | | 2 |
| 2 | | -2 | | 2 |
| 2 | | -2 | | 2 |
| 2 | | -2 | | 2 |
| 1 | | | | |
| 1 | 2 | 2 | 2 | |
| 1 | 2 | 2 | 2 | |

PATTERN RECOGNITION APPARATUS

BACKGROUND OF THE INVENTION

The present invention relates to a pattern recognition apparatus for recognizing impressed characters, printed characters or the like.

It is generally desirable that the pattern recognition apparatus of the type described have a high rate of proper character recognition and be operable at a high character reading speed. One prior pattern recognition process, known as a matrix matching method, will be explained with reference to FIG. 1 of the accompanying drawings. According to this method, features called a weight pattern are predetermined for each character, there being shown a weight pattern for the letter "B". More specifically, a region containing the letter is divided into a plurality of subregions which are weighted (as shown by numerals). Different characters are weighted differently. Therefore, any desired character can be recognized by comparing the weight pattern (input pattern) of the character as read with the weight pattern of a reference character.

This known method however is disadvantageous in that the degree of registration between characters is rendered variable and unstable because of relative positional displacement of the weight pattern of a reference character and that of a character as read, and variations in the widths of character strokes. To eliminate the foregoing disadvantage, the applicant has proposed a character recognition method using a shape matrix (see applicant's Japanese Patent Application No. 56-17570). According to this recognition process, each character is broken up into 72 subregions of $9 \times 8$, a shape matrix is set up for each character by determining whether there is a pattern in the subregions or not, and a character is recognized by comparing the shape matrix with a standard matrix. However, where an impressed character is to be read, the shape matrix of the character tends to vary due to a depression on the surface on which the character is impressed, and due to the presence of dirt such as soot on the surface, and therefore it is difficult to obtain correct character recognition. Another drawback is that only a limited number of characters, i.e. not more than 10, can be recognized using a $9 \times 8$ sized matrix.

SUMMARY OF THE INVENTION

The present invention has been made to eliminate the foregoing shortcomings. It is an object of the present invention to provide a pattern recognition apparatus which has a high recognition ability and is capable of reading characters that are printed or impressed in poor conditions.

According to the present invention, a pattern recognition apparatus is provided comprising means for obtaining a bit pattern matrix representing the presence and configuration of an unknown scanned pattern in subregions of a frame which substantially encloses the scanned pattern, means for comparing the bit pattern matrix with a plurality of previously obtained bit pattern matrices for a respective plurality of known reference patterns and for outputting comparison quantity values respectively representing the degree of correspondence between the bit pattern matrix for the unknown pattern and the bit pattern matrices for each reference pattern, and means for selecting the comparison quantity values which indicate the best and next best pattern correspondence and for outputting a pattern identification signal which identifies the unknown pattern as the reference pattern corresponding to the best comparison quantity value if this best comparison quantity value compares favorably with a first preset value, and if the difference between the best and next best comparison quantity value is greater than a second preset value.

More specifically, according to the present invention, a video signal generated by a television camera from reading an impressed character, for example, is segmented through binary conversion to obtain pixel or binary data, features are extracted from the segmented data and stored in a memory, and the impressed character is recognized by performing the following process based on the stored information. The process comprises classifying an unknown pattern into a cluster of segments by analyzing association between the stored segment information pieces, defining a frame, e.g. circumsquare of a given size on the unknown pattern, dividing the square into vertical and horizontal regions with a plurality of line segments, expressing the pattern in a matrix (bit matrix B) by assigning a logic level "1", for example, to regions having a pattern and a logic level "0" to regions having no pattern, predefining a standard bit matrix $B_S{}^K$, a mask bit matrix $B_M{}^K$, and a deformation operation $D^K$ composed of either pattern bits ("1" at all times), or blank bits ("0" at all times), deformation bits (a vertical or horizontal string of bits which can be considered entirely as "1" if any one of the bits in the string is "1"), and mask bits (which vary between "1" and "0"). A program computes a quantity or distance $D^K$ between a given pattern K and the unknown pattern expressed by the bit matrix B according to the following equation $$D^K = \sum_{i=1}^{M} \sum_{j=1}^{N} B_S{}^K(i,j) \oplus [B_M{}^K(i,j) \text{ AND } D^K(B(i,j))],$$

(where $D^K(B(i,j))$) for bit (i,j) means that an arithmetic operation should be effected with "1" if any one of the combined deformation bits of the bit matrix B is "1", with "0" if not "1" and with bits invariable if other than deformation bits), where the equation is used for defining as $K_1$ a pattern having a smallest value $D_1$ for the distance $D^K$, and determining the unknown pattern as the pattern $K_1$ when the conditions $D_1 < D_U$ (preset value) and $D_2 - D_1 > D_L$ (preset value) are met, where $D_2$ is a next smallest value.

DETAILED DESCRIPTION OF THE PREFERRED EMBODIMENTS

Figure 14:
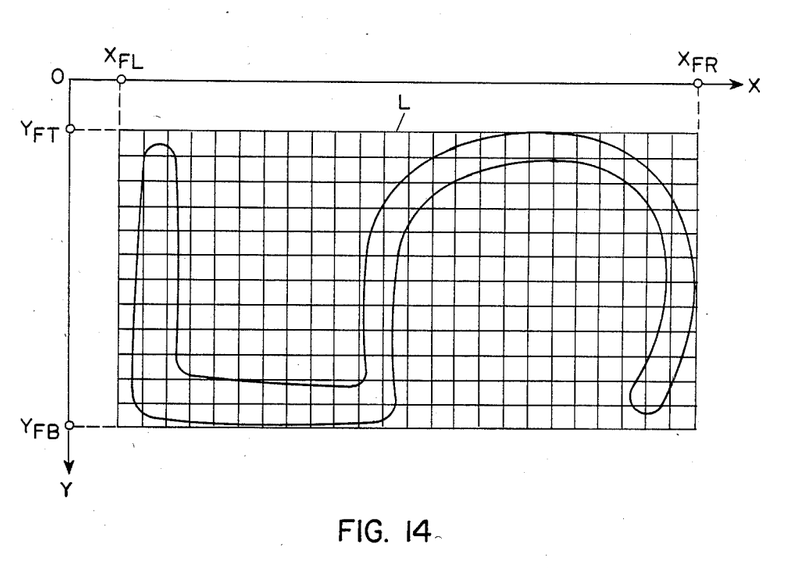
FIG. 14 is a diagram showing a quantized image of a character pattern and a circumscribed frame therearound.
Figure 15:
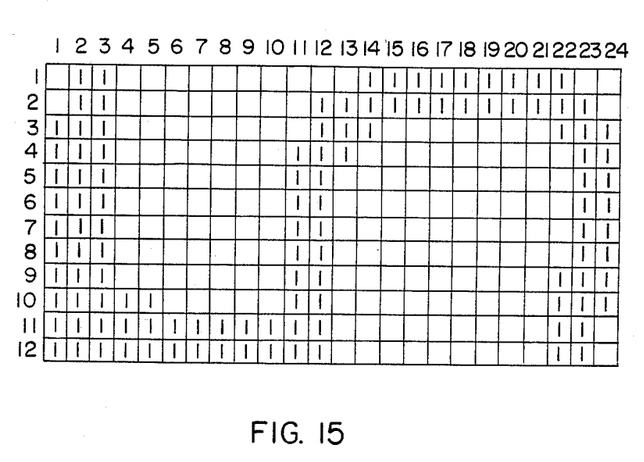
FIG. 15 is a diagram showing a bit matrix of the quantized standard bit matrix corresponding to the pattern of FIG. 14.
Figure 16:
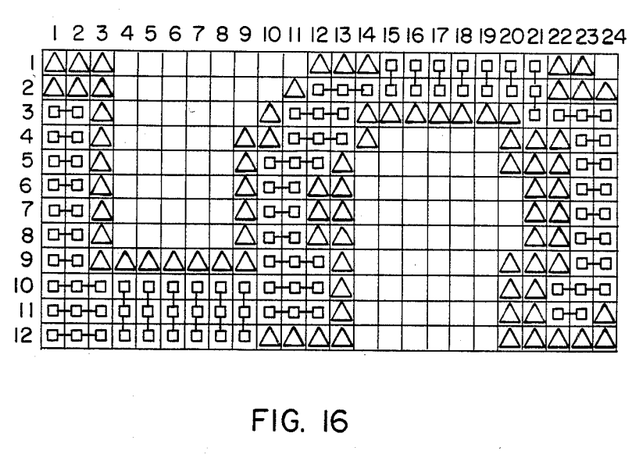
FIG. 16 illustrates an example of an identification bit matrix obtained in advance for the character "5".

In pattern and character recognition, it is necessary at some point to be able to locate "frames" or the like which circumscribe or enclose the individual patterns and characters to be identified. FIGS. 2-14 and the accompanying text are directed to the frame location process. After the frames for the particular patterns and characters are located, then the scanned data within the frame is identified. FIGS. 15 and 16 and the accompanying text, particularly the discussion concerning the matrix operations, are directed to this identification process.

Figure 2:
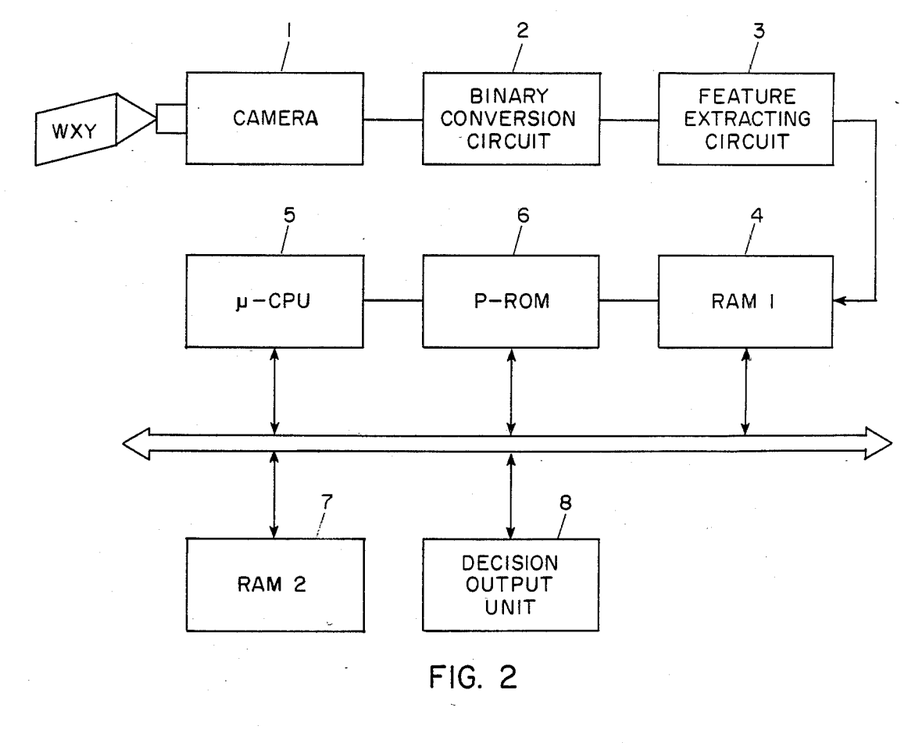
FIG. 2 is a block diagram of an embodiment of the present invention.

FIG. 2 shows a solid-state image pickup device 1 (hereinafter referred to as a "camera") in the form of a MOS transistor or charge-coupled device, a binary conversion circuit 2, a feature extracting circuit 3, an image data storage circuit (RAM$_1$) 4, and arithmetic unit such as a microprocessor 5, a PROM type memory 6 provided primarily for storing a program, a memory (RAM$_2$) 7 provided primarily for storing data, and a decision output unit 8.

Figure 3:
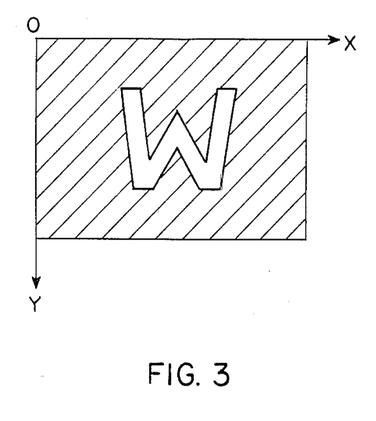
FIG. 3 is a diagram showing a quantized or binary conversion image of the letter "W"
Figure 4:
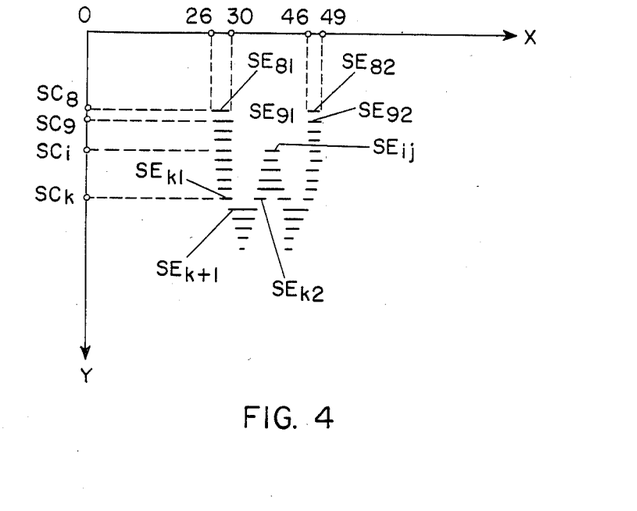
FIG. 4 is a diagram showing a segmented image of the image of FIG. 3.

A character or figure to be recognized is scanned by the camera 1 in a horizontal direction X while being vertically successively scanned in a direction Y. Video signals generated on horizontal scanning are converted into binary values with a certain threshold level by the binary conversion circuit 2. The binary image is schematically shown in FIG. 3. Regions where there are character patterns are assigned a logic level "1", and a series of logic levels "1" where the character patterns and the horizontal scanning lines intersect is called a line segment or simply a segment. The character pattern can be divided into segments (SE$_{81}$, SE$_{82}$, SE$_{ij}$, SE$_{kl}$, . . . ) on horizontal scanning lines (SC$_8$, SC$_9$, SC$_i$, SC$_k$, . . . ) as shown in FIG. 4. The character pattern can therefore be expressed by a cluster of such segments.

In order to recognize that these segments belong to the same character pattern, it is necessary to effect coordinate comparison for each segment. For example, when the current scanning line is SC$_9$, the segments SE$_{91}$, on the scanning line SC$_9$ can be determined to belong to the same pattern as that to which the segment SE$_{81}$ on the previous scanning line SC$_8$ belongs, if the Y coordinate of the segment on the current scanning line SC$_9$ differs by one coordinate unit from the Y coordinate of the segment on the previous scanning line SC$_8$, and if the X coordinates of the segments SE$_{81}$, SE$_{91}$ overlap each other at least partially.

For a clearer understanding of the foregoing, each segment will be considered by way of "start" information, "joint" information, and "connection" information. The "start" information is attached to a segment which is not directly overlapped by any segment on the previous scanning line. The segments with such start information are SE$_{81}$, SE$_{82}$, and SE$_{ij}$ in FIG. 4. The "connection" information indicates the sequence in which the segments are generated respectively on the scanning lines. The "joint" information expresses the degree of segment overlap and indicates whether two or more separate segments on a previous scanning line are "joined together" i.e. at least partially overlap one segment on the current scanning line. Those segments which are either joined or connected to, i.e. are directly overlapped by, the segments with the start information are considered as belonging to the same "unit strokes". The segments SE$_{81}$, SE$_{82}$ and SE$_{ij}$ are allotted unit stroke numbers 1, 2 and 3, respectively. The segment, SE$_{k+1}$ for instance, with joint information is given the same unit stroke number as that assigned to the righthand segment SE$_{k2}$ on the previous scanning line, since the segment SE$_{k+1}$ is directly overlapped by the segment SE$_{k2}$.

Figure 1:
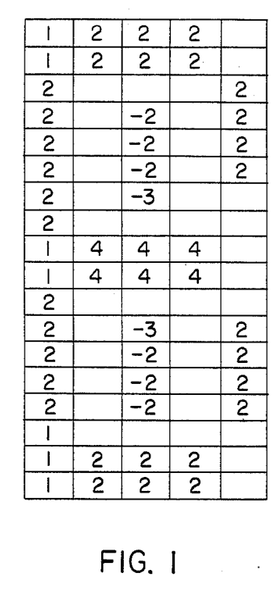
FIG. 1 is a diagram illustrative of a conventional character recognition method using a weight pattern.
Figure 5:
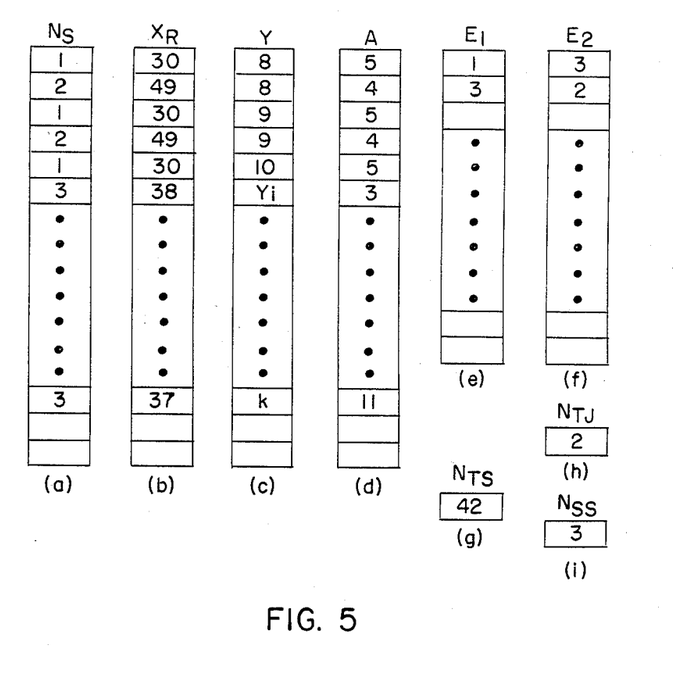
FIG. 5 is a diagram illustrative of various pieces of information on features extracted from the segment information of FIG. 4.

Features as illustrated in FIG. 5 can be extracted from the segmented image data. FIG. 5 shows unit stroke numbers of the segments at (a), coordinates of righthand ends of the segments at (b), Y coordinates of the horizontal scanning lines at (c), segment lengths at (d), sets of joined unit stroke numbers at (e), (f), the total number of segments at (g), the total number of segment joints at (h), and the total number of unit strokes at (i). These features are stored in the arrangement shown in the memory 4 (FIG. 1). The segment length A is expressed by $(X_R - X_L + 1)$ which is the sum of the difference between the X coordinate ($X_R$) of the righthand end and the X coordinate ($X_L$) of the lefthand end, and a constant $+1$. A value of $+1$ is added because otherwise the segment length will be zero (and inconvenient) when the X coordinates of the righthand and lefthand ends are the same.

Figure 6:
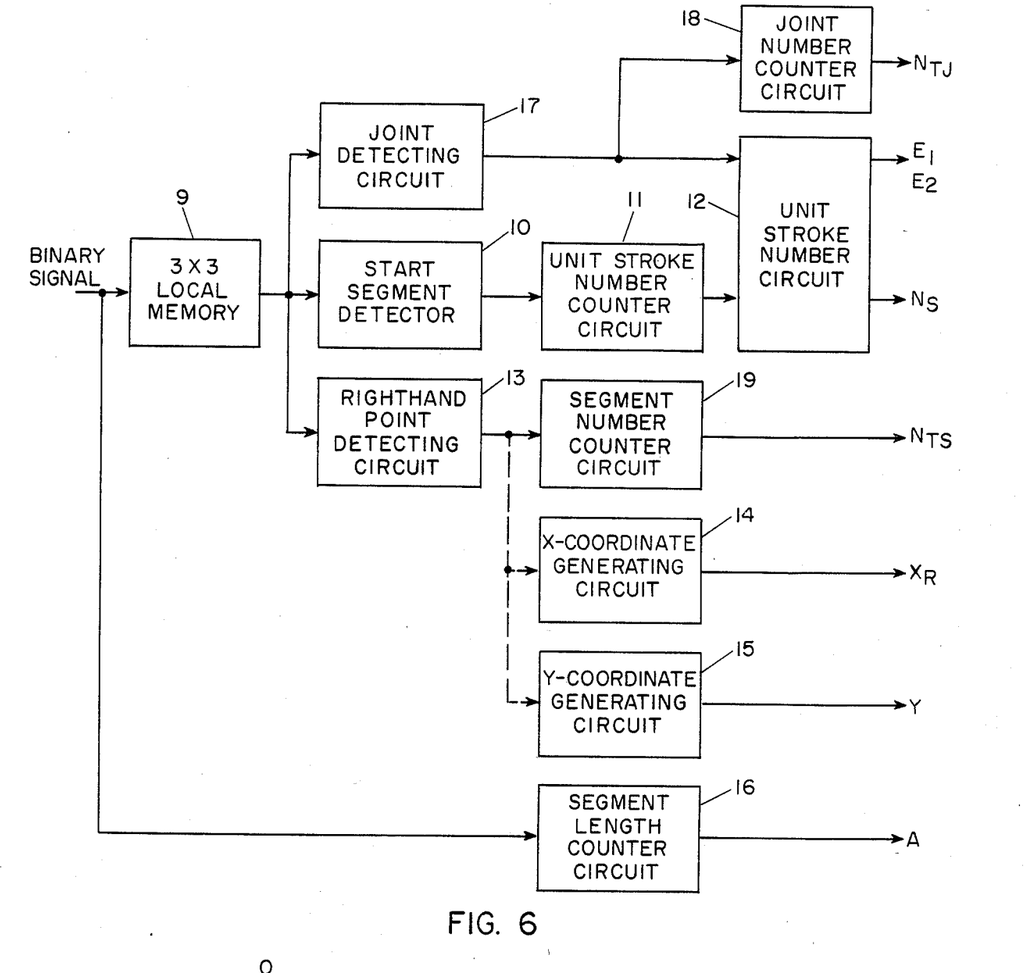
FIG. 6 is a block diagram of a feature extracting circuit.

FIG. 6 shows in block form a feature extracting circuit for extracting the foregoing features.

The feature extracting circuit includes a 3×3 local memory 9 for storing binary signals for three scanning line, and the scanning line which preceded the last scanning line. The feature extracting circuit also includes a start segment detecting circuit 10, a unit stroke number counter circuit 11, a unit stroke number register 12, a righthand point detecting circuit 13, an X-coordinate generator circuit 14, a Y-coordinate generator circuit 15, a segment length counter circuit 16, a joint detecting circuit 17, a joint-number counter circuit 18, and a segment-number counter circuit 19.

The binary video signals processed by the binary conversion circuit are supplied to the 3×3 local memory 9. The start segment detecting circuit 10 detects start segments from an output of the 3×3 local memory 9, and the detected start segments are counted by the counter circuit 11 which stores an updated unit stroke number in the unit stroke number register 12. The righthand point detecting circuit 13 detects the positions of the righthand points of the segments, and outputs X, Y from the X-coordinate and Y-coordinate generators 14, 15 are written into the image memory 4 (FIG. 1) in timed relation to detection by the righthand point detecting circuit 13. The counter circuit 16 counts the length of the segment by counting the number of consecutive points in which the binary signal has a logic level of "1", and the count from the counter circuit 16 is issued as the segment length A. The joint detecting circuit 17 detects the presence of a segment joint from the output from the local memory 9, and supplies data indicating the presence of the detected segment joint to the joint-number ($N_{TJ}$) counter circuit 18, and also to the unit stroke number register 12. When the unit stroke number register 12 detects joint information, it issues unit stroke information pieces $E_1$, $E_2$ that are joined, and also issues a unit stroke number $N_S$ for each unit stroke information piece. The segment-number counter circuit 19 counts the number of righthand point detection signals and issues a total segment number $N_{TS}$.

Figure 7:
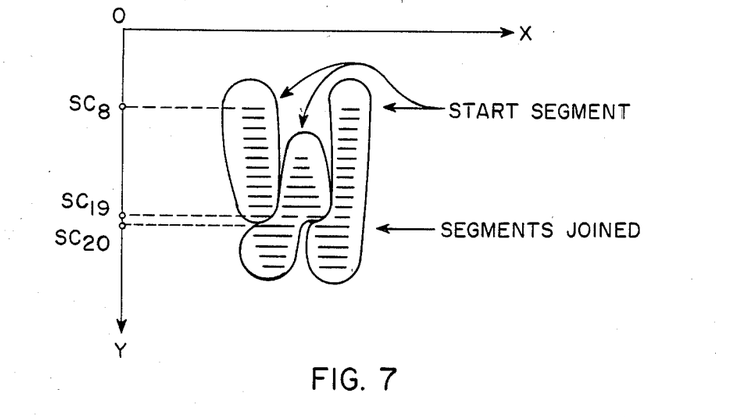
FIG. 7 is a diagram explanatory of unit stroke number of segments.
Figure 8:
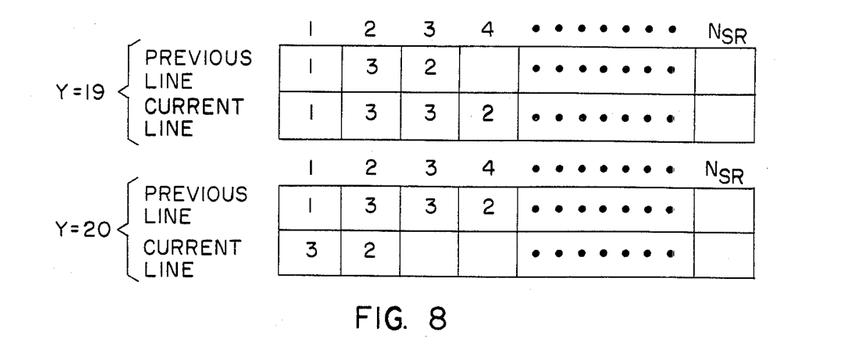
FIG. 8 is a diagram showing a unit stroke number register.

FIG. 7 is a diagram which illustrates the unit stroke numbers of the segments, and FIG. 8 is a diagram showing the content of the register (see 12 in FIG. 6) which temporarily stores the unit stroke numbers.

As described with reference to FIGS. 4 and 5, the letter "W" is segmented, and the segments are numbered with unit stroke numbers based on the sequence in which the segments appear on the horizontal scanning lines and on the start information. Thus, the letter "W" can be considered as a combination of segments assigned unit stroke numbers "1", "2" and "3" as shown in FIG. 7. Subsequently, the sequence or unit stroke numbers of the segments on the horizontal scanning lines $SC_{19}(Y=19)$ and $SC_{20}(Y=20)$ are considered. The unit stroke numbers on the scanning line $SC_{19}$ are 1, 3, 3 and 3, and the unit stroke numbers on the scanning line $SC_{20}$ are 3 and 2. These pieces of information are stored in the unit-number register in a pattern as shown in FIG. 8. By checking the stored content of the unit-number register, the number of unit strokes $N_{SS}$ and the sets of unit stroke numbers $E_1$, $E_2$ joined with each other can be obtained. Since one character pattern can be regarded as a cluster of segments to which unit stroke numbers are assigned, features can be extracted from the character pattern by the feature extracting circuit. The features of character patterns are stored in the memory ($RAM_1$), and the arithmetic unit 5, which is preferably microprocessor CPU, performs prescribed arithmetic operations on the stored feature information in accordance with the program stored in the PROM 6 to recognize the character pattern.

Figure 9:
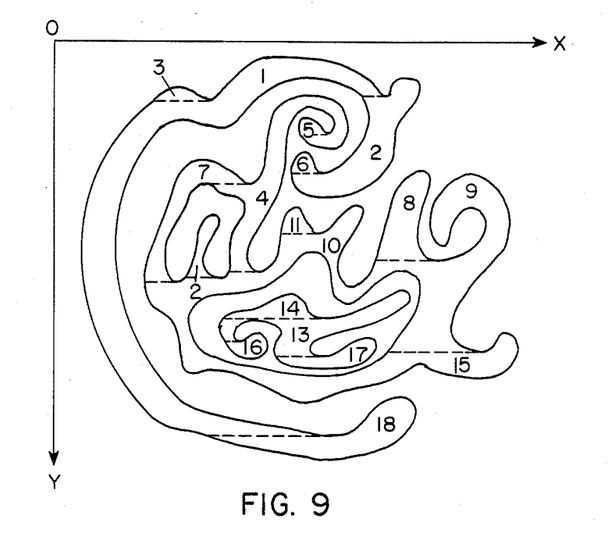
FIG. 9 is a diagram showing the relationship between the unit stroke numbers and their unit stroke areas of a pattern.
Figure 10:
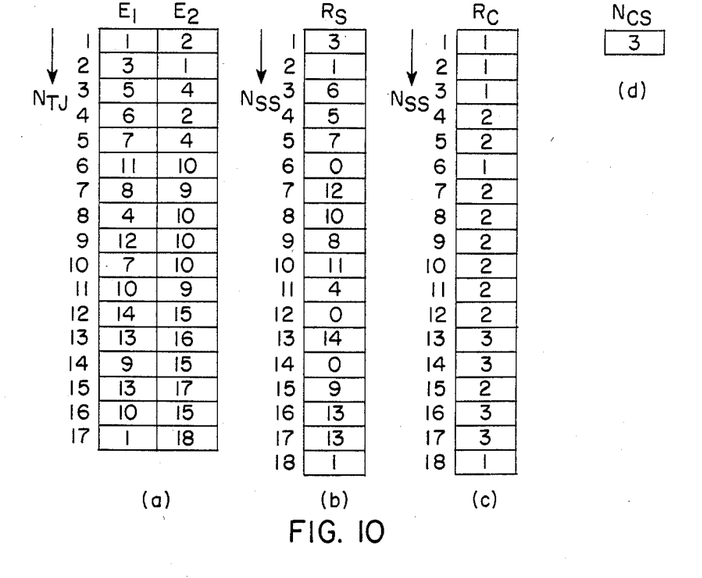
FIG. 10 is a diagram of sets of unit stroke numbers, and unit stroke and plural stroke files for the pattern of FIG. 9.
Figure 11:
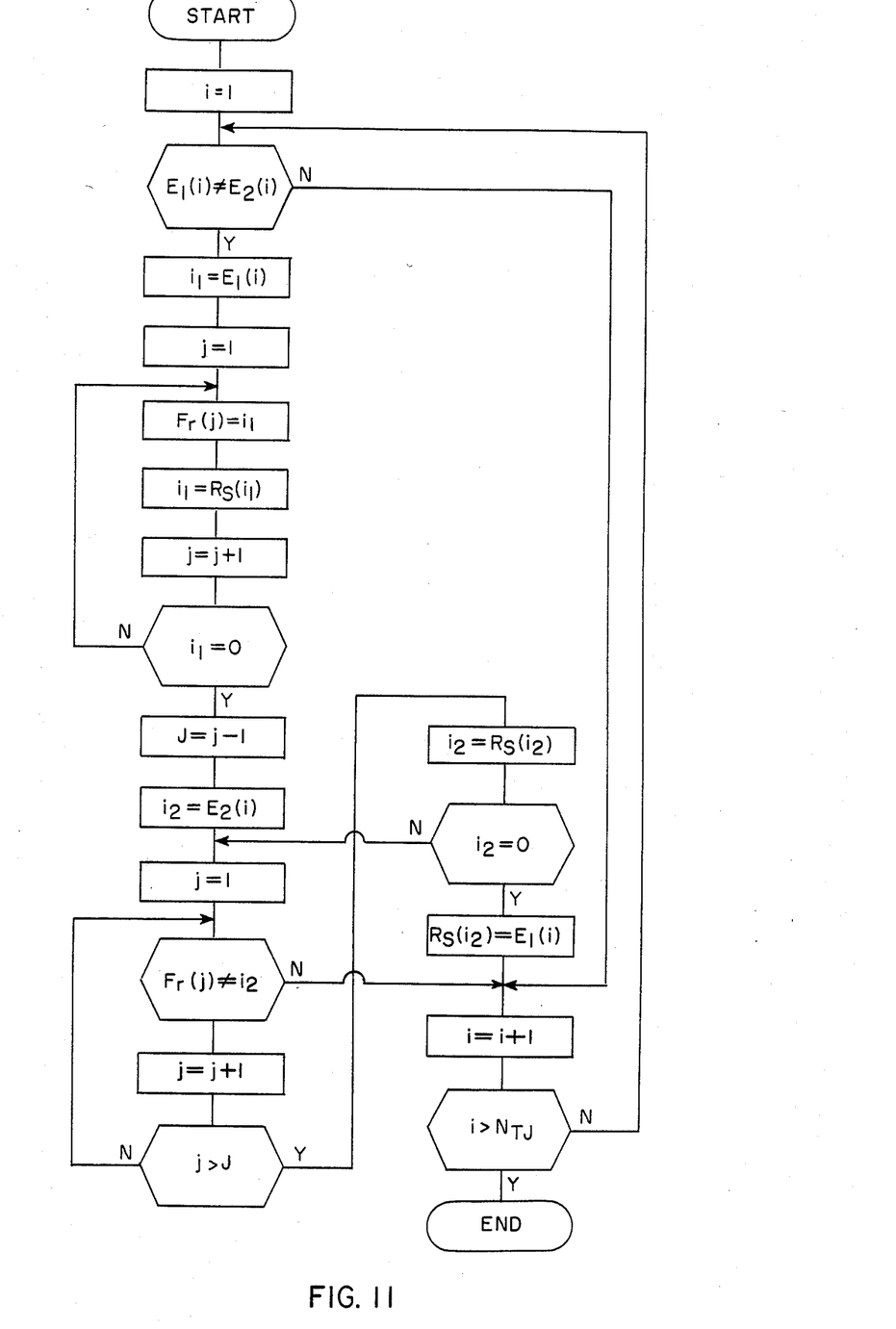
FIG. 11 is a flowchart showing a program for obtaining a unit stroke file.
Figure 12:
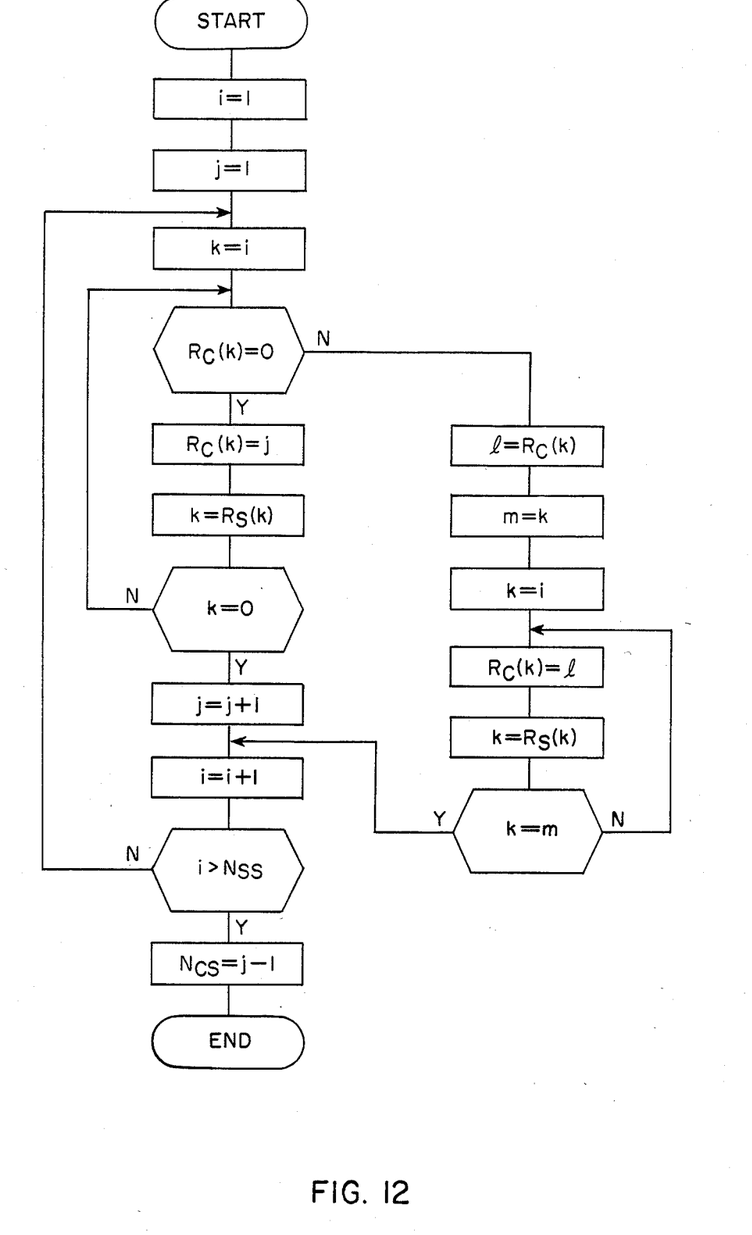
FIG. 12 is a flowchart showing a program for obtaining a plural stroke file.

While in the foregoing embodiment the present invention has been described with reference to a simple character pattern, complex character and figure patterns can also be processed in the same manner as described above. Such a processing method will now be described.

Where the pattern to be recognized has a complex shape such as shown in FIG. 9, segments are given unit stroke numbers 1 through 18 as illustrated on the basis of start information in the manner as described above. The regions of the unit strokes are clearly defined by dotted lines shown in FIG. 9. Sets of unit stroke numbers $E_1$, $E_2$ joined together as shown at (a) in FIG. 10 can be determined from the joint information of each unit stroke. The file of $E_1$, $E_2$ is used to derive a file of unit strokes $R_S$ as shown at (b) in FIG. 10 and a file of plural strokes $R_C$ as shown at (c) in FIG. 10. The unit stroke file $R_S$ is prepared by removing mutually overlapping and redundant unit stroke numbers form the sets $E_1$, $E_2$ of unit stroke numbers joined together. FIG. 11 shows a program for preparing such a unit stroke file.

The plural stroke file $R_C$ is prepared by arranging the unit stroke file $R_S$ so that the numbers of plural strokes (corresponding to the patterns of the characters or figures to be recognized) which are actually a combination of unit strokes joined together are reassigned the lowest unit stroke number in the combination. This process is carried out in accordance with a program illustrated in FIG. 12. The number $N_{CS}$ of plural strokes shown in FIG. 9, that is, patterns is found to be "3". The program shown in FIGS. 11 and 12 may be written in FORTRAN. $E_1$, $E_2$ are sets of unit strokes joined together, $N_{TJ}$ is the number of joints, $N_{SS}$ is the total number of unit strokes, $N_{CS}$ is the total number of plural strokes, $F_T$ is a temporary file used for checking whether the unit strokes are overlapped, $R_S$ is a file having a size determined by the total number $N_{SS}$ of unit strokes, $R_C$ is a file of a size determined by the total number $N_{CS}$ of plural strokes, i, j, k, l, m are citation numbers for the files. The files $R_S$, $R_C$ are initialized to zero when the program is to be executed. The area $A_C$, width $W_C$, height $H_C$, maximum X and minimum Y of lefthand and righthand points, coordinates $X_R$, $X_L$, $Y_T$, $Y_B$ of the maximum X and minimum Y, and central coordinates $X_C$, $Y_C$ thereof can all be determined for each of double strokes or patterns.

The process for actually recognizing or identifying a character pattern based on the features as described above will now be described.

Figure 13:
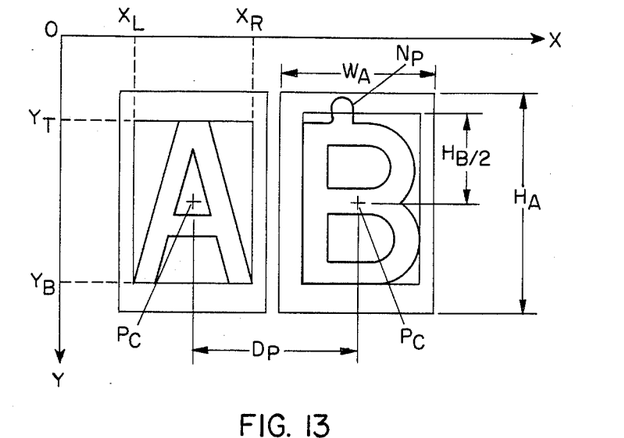
FIG. 13 is a diagram illustrative of the manner in which a character pattern is defined.

FIG. 13 is a diagram illustrative of the manner in which a character pattern is defined; FIG. 14 is a diagram showing a quantized character image and its circumscribing frame (circumsquare); FIG. 15 is a diagram illustrating a bit matrix for the quantized image shown in FIG. 14; and FIG. 16 is a diagram illustrative of an example of a standard bit matrix corresponding to the pattern of FIG. 14.

There are considered two methods of defining a character pattern. In the first method where a character pattern is locally narrow or cut off as with an impressed character, or where small noise patterns tend to be generated due to cuts, oil, soot or other dirt, the dirt or scar pattern is removed according to area, width or height, and a pattern corresponding to the size of a character is found from the remaining patterns. A center $P_C$ of a pattern corresponding to a character size as shown in FIG. 13 serves as a reference. The character center $P_C$ is extrapolated on the basis of a distance $D_P$ between the character center and the center of another character. A pattern which is contained in a search frame (having a width $W_A$ and a height $H_A$) of a predetermined size is considered to be a character pattern. The character "A" in FIG. 13 is free from the influence of any noise patterns, while the character "B" is affected by a noise pattern $N_P$. When there is noise $N_P$, the character frame should be limited within the range of an upper limit HB for a character height, and any portion beyond the upper limit should be neglected. However, the character frame for a single character pattern to be recognized cannot be extrapolated.

In the second method of defining a character pattern where a character pattern is clear and no noise pattern appears to be present, a pattern which enters a character frame defined by a height $H_U$ (upper limit), a height $H_L$ (lower limit), a width $W_U$ (upper limit), and a width $W_L$ (lower limit) is determined as a character pattern. Stated otherwise, a pattern is determined as a character pattern when it meets the following conditions:

$$W_L \leq W_C \leq W_U,$$

$$H_L \leq H_C \leq H_U,$$

where $W_C$ and $H_C$ are the width and height of a standard size character pattern.

A character pattern is thus defined to extract a character frame. FIG. 14 shows a character "5" and a character frame L, in which coordinates of maximums X and Y and those of minimums X, Y are $X_{FR}$, $Y_{FB}$ and $X_{FL}$, $Y_{FT}$, respectively. While the character pattern is shown oriented horizontally, it is not essential that character patterns be oriented horizontally or vertically.

Next, the character frame as defined in the foregoing manner is divided into 24 subregions in the X-axis direction and 12 subregions in the Y-axis direction. If part of a character pattern is present in a subregion, such subregion is expressed by a logic level "1", and if no part of the character pattern is present in a subregion, such subregion is expressed by a logic level "0". The subregions as expressed by the logic levels are shown as a matrix in FIG. 15 which will hereinafter be referred to as a bit matrix B. The blank subregions in FIG. 15 indicate "0".

Each character to be recognized is measured in advance to obtain its identification bit matrix, and the elements of the bit matrix are classified into four kinds of bits or elements as set forth below:

(a) pattern bit; an element or bit which has a value of "1" at all times;

(b) blank bit; an element or bit which has a value of "0" at all times;

(c) mask bit; an element or bit which has a value of either "1" or "0", but does not contribute to the identification process, i.e. the identification process "doesn't care" what this value is; and (d) deformation bit; a bit in a horizontal or vertical string of bits which is determined as "1" if any one of the bits in the particular string which includes the bit under consideration is "1".

FIG. 16 illustrates an example of an identification bit matrix obtained in advance for the character "5". The bits are indicated by symbols. The blank areas indicate blank bits, the symbol ($\Delta$) indicates mask bits, and the symbol ( $\square\!\!-\!\!\square$ ) indicates a string of deformation bits. The illustrated bit matrix of FIG. 16 contains no pattern bits.

The bit matrix B is obtained for each character and figure pattern K to be recognized, and the elements of the bit matrix are classified into the four bit groups. so that a standard bit matrix $B_S{}^K$ and a mask it matrix $B_M{}^K$ are defined, and a deformation bit matrix $D^K$ acting on the measured by matrix B is also defined for each character K. The mit matrices and the deformation operator are determined as follows:

$B_S{}^K(i,j) = 1$ for a pattern bit or deformation bit and 0 for a bit other than above bits, for a bit at location $(i,j)$;

$B_M{}^K(i,j) = 1$ for a bit other than mask bit and 0 for a mask bit, for a bit at location $(i,j)$; and $D^K(B(i,j)) = 1$ where any bit in the relevant deformation bit string is "1" and 0 where all of the bits in the relevant string are "0".

A quantity or distance $D^K$ representing the amount or degree of difference or correspondence unknown character pattern expressed by a bit matrix B is defined by:

$$D^K = \sum_{i=1}^{M} \sum_{j=1}^{N} B_S{}^K(i,j) \oplus [B_M{}^K(i,j) \text{ AND } D^K(B(i,j))],$$

In the example shown in FIG. 16, M=12 and N=24. The sign ($\oplus$) stands for the exclusive-OR operation, and AND stands for the logic AND operation.

The value $D^K$ is inversely proportional to the degree of correspondence between the character K and the character to be recognized, i.e. $D^K$ is relatively low for close pattern correspondence, and higher for lack of correspondence. The quantity or distance $D^K$ is determined for all character patterns, and the smallest distance $D_1$ and the next smallest distance $D_2$ are determined. The unknown pattern is determined or identified as the pattern $K_1$ having the minimum $D_1$ when $D_1 < D_U$ and when $D_2 - D_1 > D_L$, where $D_U$ and $D_L$ are preset values which are determined differently for character readout and character checking.

With the present invention, as described above, unit stroke and plural stroke processing arrangements are employed so that a character can be defined without being largely influenced by noise patterns and by positional displacement of an input pattern and interpattern distance. By using deformation operator and a mask bit matrix, protection can be gained against fluctuations of character definition due to variations in the width of character strokes and small noise patterns. The character recognition process can be effected at a high speed with the use of a unit stroke and plural stroke processing algorithm.

Although the present invention has been described as being embodied for recognition of impressed or printed characters, the invention is also applicable to recognition of special symbols such as those found on a typewriter keyboard.

From the foregoing, it will be observed that numerous variations and modifications may be effected without departing from the true spirit and scope of the novel spirit of the invention. It is to be understood that no limitation with respect to the specific apparatus illustrated here is intended or should be inferred. It is, of course, intended to cover by the appended claims all such modifications as fall within the scope of the claims.

I claim:

1. A pattern recognition apparatus comprising:

means for obtaining a M×N bit pattern matrix B(i,j) representing the presence and configuration of an unknown scanned pattern in subregions (i,j) of a frame which substantially encloses the scanned pattern, and for determining the general center of a pattern and for forming a frame having a certain size generally centered on said pattern center, wherein each bit in the pattern has a pattern present value when the scanned pattern falls at least partially within its associated subregion or a pattern absent value when the scanned pattern does not fall within its associated subregion;

means for comparing the bit pattern matrix with a plurality of previously obtained bit pattern matrices $B_S{}^K(i,j)$ for a respective plurality of known reference patterns K, and for outputting for each reference pattern K a comparison quantity value $D^K$ whose amplitude represents the degree of correspondence between the bit pattern matrix B(i,j) for the unknown pattern and the bit pattern matrices $B_S^K(i,j)$ for each reference pattern K according to the formula:

$$D^K = \sum_{i=1}^{M} \sum_{j=1}^{N} B_S^K(i,j) + [B_M^K(i,j) \text{ AND } D^K(B(i,j))],$$

where:

$D^K$ is a deformation matrix operator for the reference pattern K which replaces a pattern absent bit value in $B(i,j)$ with a pattern present bit value for all subregion bits in each bit string, if at least one of the bits in the respective bit string which includes the bit under consideration has a pattern present value, $B_M^K(i,j)$ is a mask bit matrix for the reference pattern K which contains pattern absent bit values at positions which do not significantly aid in distinguishing the pattern K from another pattern, thereby enabling the identification process to ignore the value of this bit obtained directly from the scan, and $B_S^K(i,j)$ is a standard bit matrix for the reference pattern K which contains pattern present bits at positions where an ideal reference pattern K would at least partially occupy the corresponding subregion positions, and which contains pattern absent bits where an ideal reference pattern K would not have any of its portion occupying the corresponding subregion positions;

means for selecting the lowest and next lowest comparison quantity values and for outputting a pattern identification signal which identifies the unknown pattern as the reference pattern corresponding to the lowest comparison quantity value if this lowest comparison quantity value is less than a first preset value, and if the difference between the lowest and next lowest comparison quantity values is greater than a second preset value wherein the values of comparison quantity values are generally inversely proportional to the degree of correspondence between the bit matrix pattern and the reference pattern matrices.

* * * * *

UNITED STATES PATENT AND TRADEMARK OFFICE
CERTIFICATE OF CORRECTION

PATENT NO. : 4,556,985

DATED : Dec. 3, 1985

INVENTOR(S) : Yasuo Hongo

It is certified that error appears in the above-identified patent and that said Letters Patent is hereby corrected as shown below:

Col. 5, line 66, "form" should read --from--.

Col. 7, line 52, "it" should read --bit--.

Col. 7, line 55, "mit" should read --bit--.

Col. 9, line 5, that part of the formula reading "+" should read --$\oplus$--.

Signed and Sealed this

Eleventh Day of March 1986

[SEAL]

Attest:

DONALD J. QUIGG

Attesting Officer  Commissioner of Patents and Trademarks